June 19, 1928.
H. N. HARRISON
FARM WAGON
Filed Nov. 24, 1926
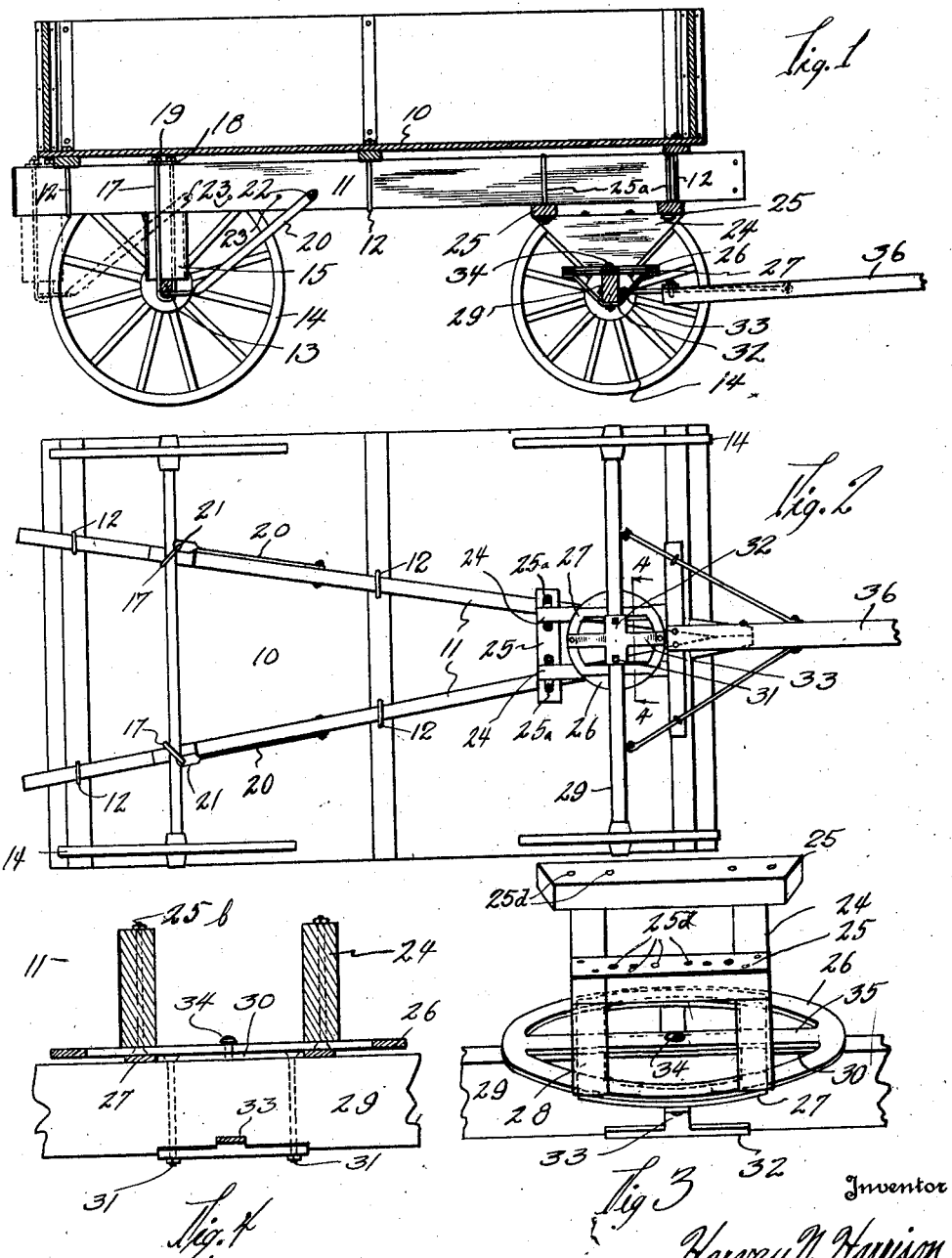
Inventor
Harvey N. Harrison
By Lynn H. Latta
Attorney Patented June 19, 1928.

1,674,511

UNITED STATES PATENT OFFICE.

HARVEY N. HARRISON, OF WASHTA, IOWA.

FARM WAGON.

Application filed November 24, 1926. Serial No. 150,499.

My invention relates to a farm wagon such as that of my patent #1,588,414, issued June 15, 1926.

My general purpose is to provide a general utility farm wagon which is readily convertible from a grain or manure wagon into a hay rack or the like.

More specifically, it is my object to provide a farm wagon including a pair of stringers supported by a pair of axles and so connected to said axles that the stringers may be adjusted laterally relative to each other to increase or decrease their distance apart and the axles may be adjusted longitudinally of the stringers in order to change the length of wheel base of the vehicle, either of said adjustments being accomplished in a very simple manner by the same means.

A still further object is to provide a front axle mounting, giving a greater degree of flexibility to the wagon and particularly allowing a limited amount of side swing of the body relative to the front axle.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a longitudinal, sectional view through the wagon.

Fig. 2 is an inverted plan of the wagon.

Fig. 3 is a perspective view taken from the front, of the front axle mounting.

Fig. 4 is a sectional view taken on the line 4—4 of Fig. 2.

In my prior patent, hereinbefore referred to, I have described a farm wagon adapted for general farm use and comprising generally a pair of stringers of wood, rectangular in cross section and positioned with the greater dimensions in vertical planes. The rear axle, as therein described, is connected to the stringers by means of a pair of brackets attachable to the stringers by U bolts embracing the brackets and the stringers. These brackets were socketed to receive the stringers and the axle and were provided with ears to retain the U bolts.

In attempting to simplify the construction of these links which connect the axle to the stringers, I have discovered that by using a pair of rectangular blocks, preferably of wood, that the frictional engagement of the faces of the blocks respectively with the stringers and the axle, produced by tightening of the U bolts, will be effective to unite the axle, connecting blocks, and stringers into a solid unitary structure.

I have used the reference character 10 to indicate generally a wagon box such as is illustrated in my patent, referred to, and the reference character 11 to indicate the stringers upon which the box 10 is mounted by means of U bolts 12, extending through the bottom of the boxes and encircling the stringers. The rear axle 13, supported by the wheels 14, engages the lower face of the rectangular blocks 15 which in turn support the stringers 11. U bolts 17 embrace the stringers 11, the blocks 15, and encircle the axle 13 and are connected at their upper ends by plates 18 and nuts 19. By tightening the nuts 19 the blocks are frictionally engaged between the axle and stringers, and I find that they are thus rigidly secured. The braces 20, provided with perforated ends 21 receiving the U bolts 17 and clamped between the bolts and the axle as in my former patent, extend forwardly and diagonally upward to the stringers to which they are connected by means of bolts 22.

I provide a plurality of openings 23 to receive the bolts 22 and by loosening the nuts 19, the blocks 15 may be slid longitudinally of the stringers and thus, in a very simple manner, change the position of the rear axle relative to the stringers.

It will be noted that the wagon box can readily be removed by removing the U bolts 12 and a hay rack may be substituted in place of the box 10 and secured to the stringers in the same manner. When the box 10 is used, the wheels are positioned under the wagon box as shown. When the hay rack is used, it is desirable to lengthen the wheel base of the wagon and this is quickly done by adjusting the rear axle as described. The front axle construction includes a pair of blocks 24 secured, either directly to the stringers 11, or by the medium of cross bars 25, and at their lower face secured to a fifth wheel ring 26.

The ring 26 is supported upon a lower fifth wheel ring 27 which, at forward and rear, registers with the periphery of the ring 26, but at its sides is cut away to form the parallel side members 28, and to allow the ring 26 to project beyond it at the sides. The ring 27, in turn, is supported upon the axle 29, being provided with a central cross bar 30 which rests upon the axle 29 and which is secured thereto by bolts 31 extending vertically through the axle. It will be noted that the axle is rectangular in cross section and it is preferably formed of wood. A brace for the lower fifth wheel ring 27 includes a channel member 32 secured to the axle by means of the bolts 31 and embracing the sides thereof. Arms 33 extend diagonally upwardly to the ring 27 where they are secured to the periphery thereof.

It will be noted that a space is left between the ring 26 and the upper face of the axle 29. The king pin stud 34 is secured to the lower fifth wheel ring and received through the upper fifth wheel ring in the same manner as described in my former patent. The stud allows a slight amount of play between the rings.

I find that the engagement of the registering portions of the rings will effectively prevent tilting of the axle forwardly or rearwardly, but that a small amount of tilting laterally of the axle relative to the wagon body is allowed. This gives a greater resiliency to the wagon which is otherwise rigidly constructed with the view to simplification and long service.

The tongue 36 is secured to the front axle 29 in the same manner as in my preceding patent, alluded to and no further description of the tongue is deemed necessary. The cross bars 25 allow adjustment of the stringers away from each other at the forward ends, which is desirable when changing from one type of wagon box to another. The bars 25 are secured to the stringers 11 by means of U bolts 25ᵃ and the blocks 24 are secured to the ring 26 by means of bolts 25ᵇ.

The U bolts 25ᵃ are received through openings 25ᵈ in the cross bars 25. The openings 25ᵈ in the forward bar 25 are provided in pluralities of pairs so that the attachment of the forward ends of the rails 11 may be adjusted in a lateral direction to bring the ends of the rails nearer or farther apart.

It will now be seen that when it is desired to change the nature of the wagon from that of a small wagon for holding grain or the like to that of a hay rack, that the width between the stringers over the rear axle may be increased by loosening the U bolts and sliding the stringers apart. It is understood that when doing this, the wagon box has been removed. The same operation of loosening the U bolts serves also to allow adjustment of the axle rearwardly relative to the stringers in order to lengthen the wheel base. In this rearward adjustment, it is also necessary to remove the connection of the brace 20 but the connection between the stringers and axle is such as to permit, when the brace 20 has been removed from the stringers 11, the adjustment in both directions. It is this convertible feature which gives to the wagon a wide range of utility on the farm.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In a farm wagon, front and rear axles, a pair of longitudinally extending, laterally spaced, stringers, supported upon the front and rear axles, the stringers being secured to the rear axle through the medium of blocks engaged between the axle and the lower surface of the stringers, U bolts extending around the axle embracing the blocks and stringers and connected above the stringers so as to enable the tightening of the stringers, blocks and axle into secure engagement with each other, the loosening of said connection serving to allow the axle and blocks to be moved rearwardly relative to the stringers, and further to allow the stringers and blocks to be moved laterally relative to the axle, and a wagon box secured to the stringers by having no connection with said U bolts.

2. In a farm wagon, front and rear axles, a pair of longitudinally extending, laterally spaced, stringers, supported upon the front and rear axles, the stringers being secured to the rear axle through the medium of blocks engaged between the axle and the lower surface of the stringers, U bolts extending around the axle embracing the blocks and stringers and connected above the stringers so as to enable the tightening of the stringers, blocks and axle into secure engagement with each other, the loosening of said connection serving to allow the axle and blocks to be moved rearwardly relative to the stringers, and further to allow the stringers and blocks to be moved laterally relative to the axle, braces secured to the U bolts and adapted to be secured to the stringers at any of the several positions, and a wagon box secured to the stringers but having no connection with said U bolts.

3. In a farm wagon, a pair of stringers, and a front axle mounting comprising depending blocks secured to said stringers, a ring secured to said blocks, a front axle, a ring secured to said front axle, shaped to register with said first mentioned ring at forward and rear, and cut away at the sides, and a king bolt stud connecting the rings.

Signed this 20th day of October, 1926, at Sioux City, in the county of Woodbury and State of Iowa.

HARVEY N. HARRISON.